April 28, 1942.   F. W. PRESTON   2,281,324
APPARATUS FOR TESTING BY IMPACT
Filed Jan. 23, 1941   3 Sheets-Sheet 1
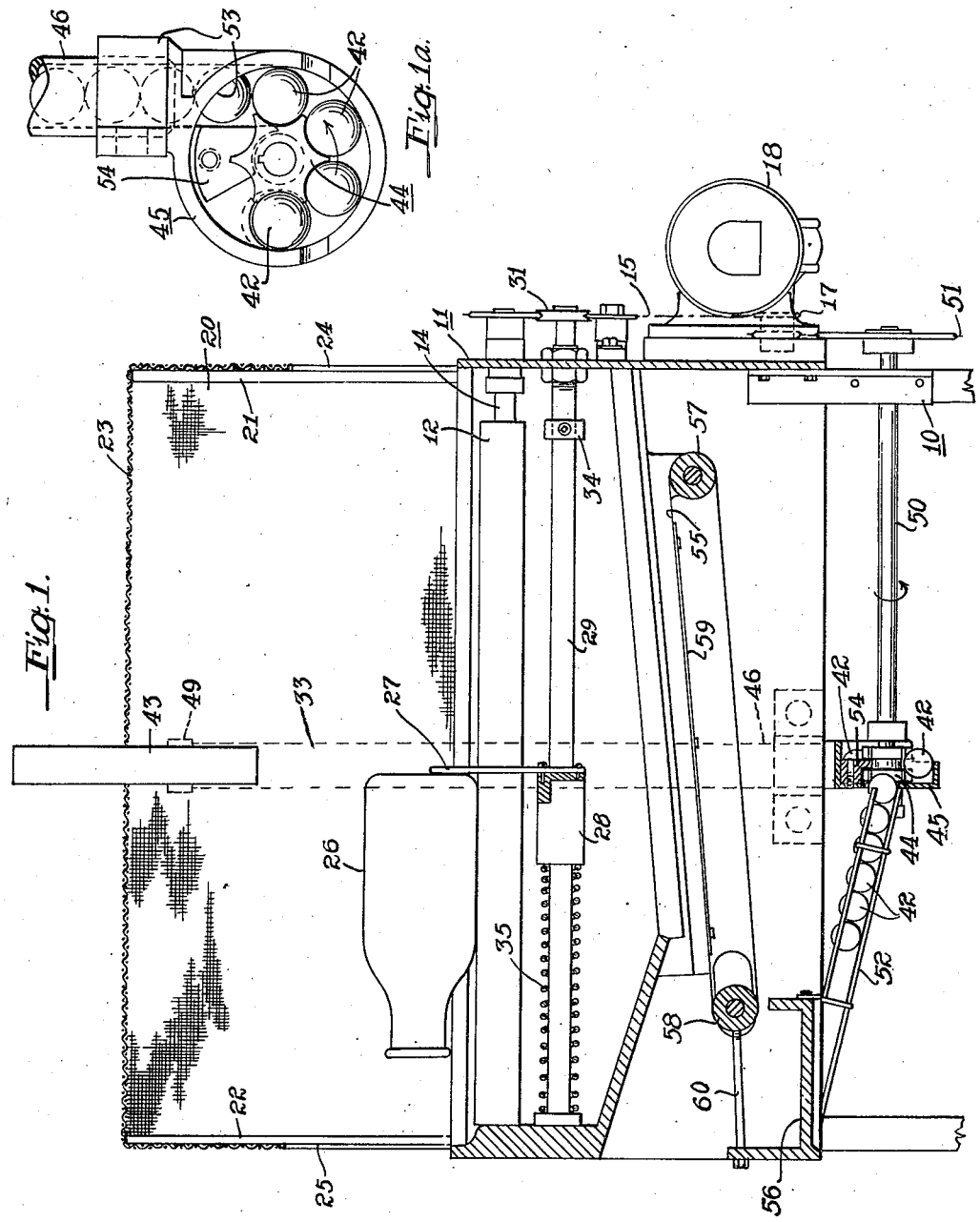
INVENTOR
Frank W. Preston
By Archworth Martin
His Attorney

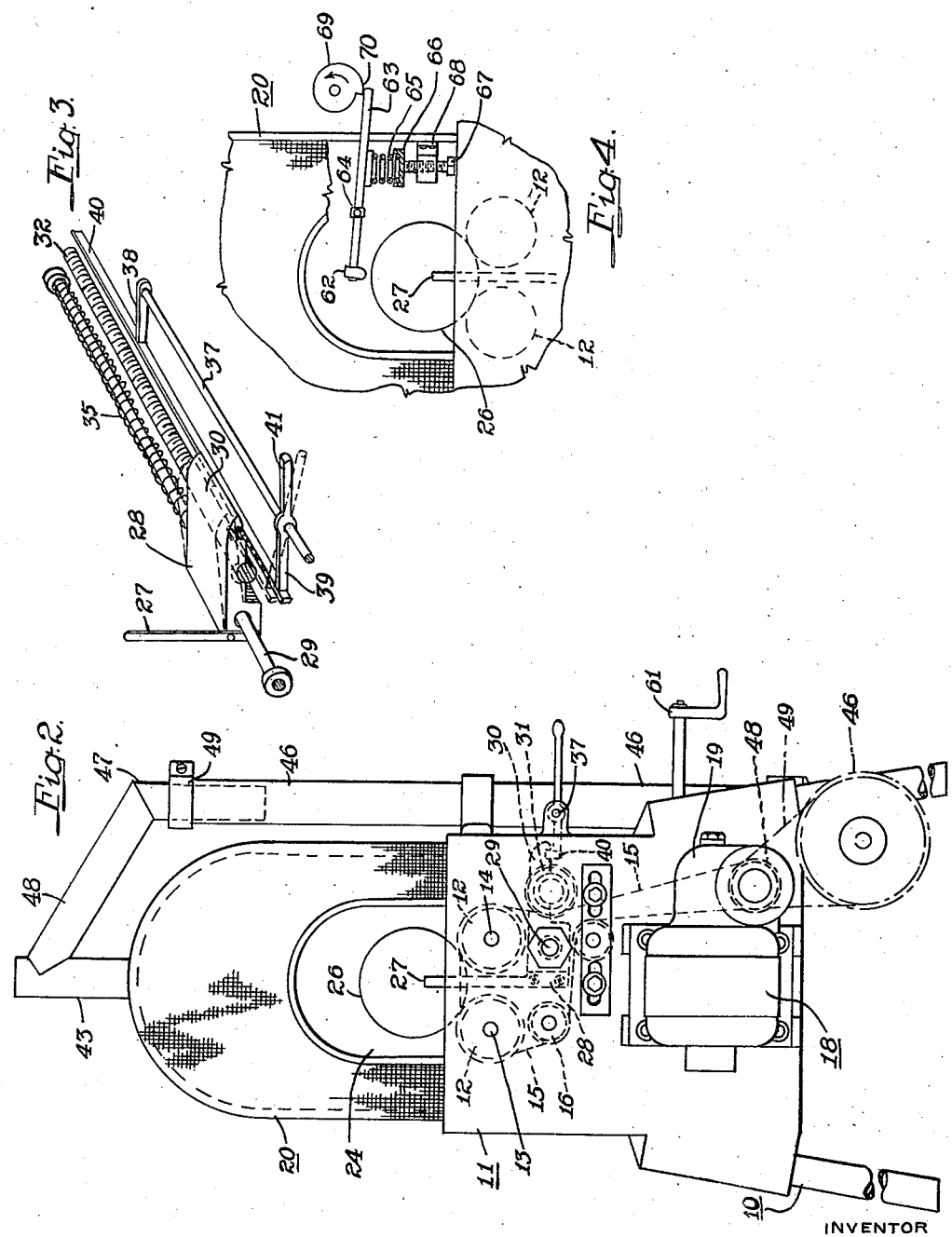

April 28, 1942.  F. W. PRESTON  2,281,324
APPARATUS FOR TESTING BY IMPACT
Filed Jan. 23, 1941  3 Sheets-Sheet 3
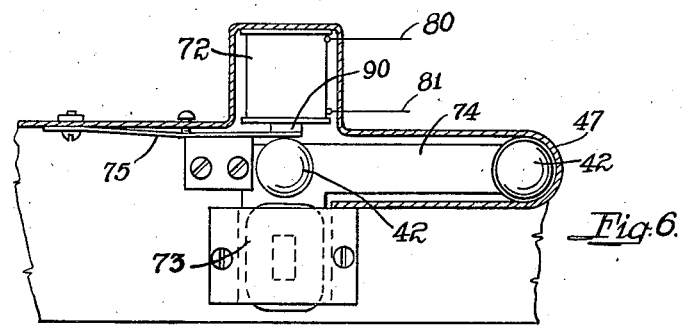
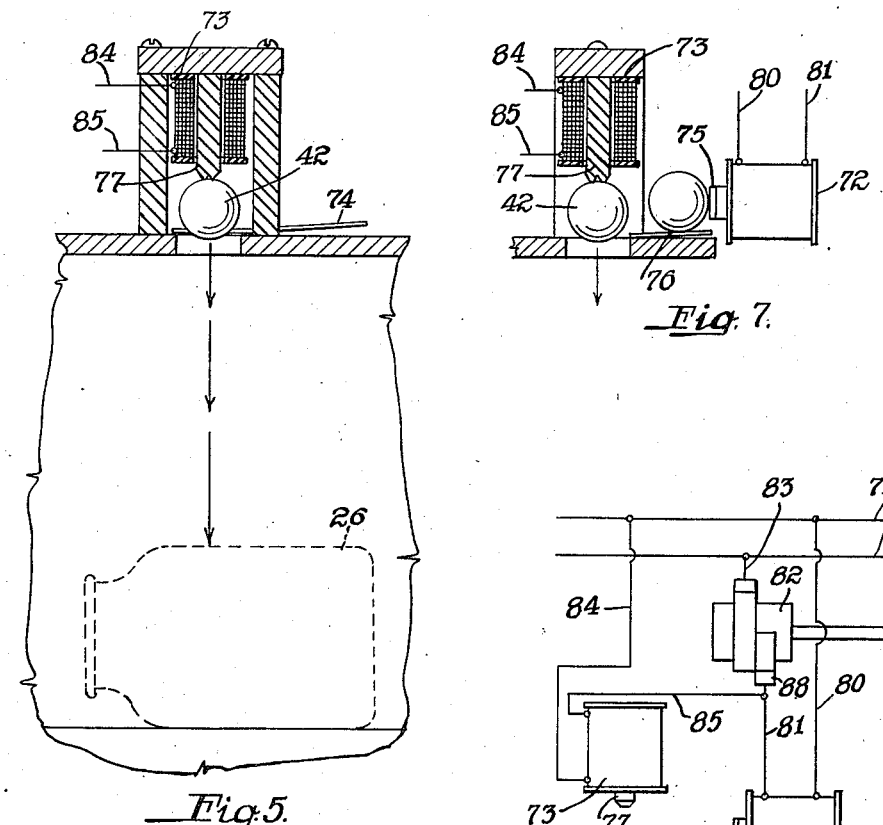
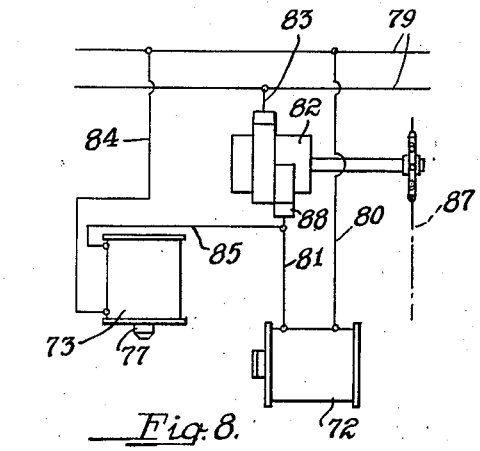
INVENTOR
Frank W. Preston
By Archworth Martin
His Attorney Patented Apr. 28, 1942

2,281,324

UNITED STATES PATENT OFFICE 2,281,324

APPARATUS FOR TESTING BY IMPACT

Frank W. Preston, Butler, Pa.

Application January 23, 1941, Serial No. 375,554

12 Claims. (Cl. 73—51)

My invention relates to the testing of articles such as glass bottles and the like by what is known as the impact method, whereby the articles are tested for strength, by the impact of metal weights or hammers.

While the articles have heretofore been tested by dropping steel balls on them or by a hammer on a swinging pendulum, the impacts have been made against only one point on an article, or at least only against a limited number of indefinitely-located points thereon, but such tests are not adequate because, for example, in the case of a bottle, a proper test requires that impacts be delivered at many points along the neck and body portion of the bottle as well as at peripheral points thereon, since there is usually some non-uniformity in the wall thickness at various points.

My invention has for its object the provision of an improved means and method whereby a bottle or the like may conveniently be effectively tested at any desired number of points spaced longitudinally and peripherally of the bottle.

Briefly stated, my invention comprises a means and a method for moving a bottle slowly in a lengthwise direction, past a point at which impacts are applied thereto, while rotating the bottle, so that not only are impacts imposed thereon at a desired number of points spaced longitudinally of the bottle, but also at points spaced circumferentially on its surface. By this method, it is quite likely that weak spots anywhere in the bottle will be discovered.

Some forms of apparatus for practicing my invention are shown in the accompanying drawings wherein Figure 1 is a longitudinal sectional view through a testing machine; Fig. 1a is an enlarged side view of a portion of the ball-moving apparatus of Fig. 1; Fig. 2 is an end elevation of the machine; Fig. 3 is a perspective view showing a portion of the apparatus for moving a bottle while applying impacts thereto; Fig. 4 shows a modification of the impacting means of Figs. 1 and 2; Fig. 5 is a longitudinal sectional view showing another means for feeding or moving impact elements against the bottles; Fig. 6 is a sectional plan view of the structure of Fig. 5; Fig. 7 is a sectional view of the apparatus taken at right angles to the view of Fig. 5, and Fig. 8 is a diagrammatic view showing the manner in which the circuits of the electromagnets of Figs. 6 and 7 are controlled.

Referring first to Figs. 1 to 3, I show a framework 10 on which is mounted a box-like casing 11 in which is journaled a pair of rubber-covered rollers 12 that are carried by shafts 13 and 14 respectively. The shafts 13 and 14 have sprocket wheels around which a chain 15 passes for the purpose of driving the rolls 12 in the same direction. The chain 15 passes around a guide sprocket 16 that is suitably journaled on the casing 11 and around a sprocket 17 that is driven from a motor 18 through suitable reduction gearing contained within a gear case 19.

Upon the case 11 I mount a hood or shield 20 having end frame members 21 and 22 that support a covering 23 which may be of wire mesh or transparent sheet material, that will protect the operator against fragments of glass, but will permit him to observe the impacting operation. Openings 24 and 25 are provided in the ends of the hood 20 to permit placing of bottles 26 on the rollers 12 and removal of the bottles therefrom.

The turning of the rollers 12 serves to rotate the bottles even though the bottles are not of circular contour. For example, bottles which are approximately square in cross-section as well as oval bottles can be rotated. The bottles while being rotated are advanced from the opening 24 toward the opening 25 by a pusher rod or finger 27 that is carried by a block 28 which is slidably supported upon a rod 29. The slide block 28 has an extension 30 which has a semi-circular recess in its underside, that is threaded for engagement with a screw 32. The screw 32 is journaled in the end walls of the casing 11 and has a sprocket wheel 31 which meshes with the drive chain 15, so that the pusher finger 27 will be moved longitudinally of the rollers 12 to advance the bottles from the opening 24 toward the opening 25, during which time the bottles will be subjected to impacts as hereinafter explained. The screw threads on the block 28 and on the screw 32 will preferably be of the buttress type, with the pushing faces radial so as to minimize danger of slipping of the screw threads on one another.

In Fig. 1 the pusher is shown at approximately its foremost position, at the completion of movement of a bottle past the testing station at 33. At the beginning of a testing operation, the slide 28 will be at its rearmost position against an adjustable stop collar 34 on the rod 29, a bottle 26 then being placed in front of the finger 27, so that the bottle will be advanced from the rear end at 24 toward the front end at 25 while being rotated by the rollers 12. During this advancing movement, a spring 35 which surrounds the rod 29 will be compressed, so that at the end of a feed traveling movement, when the block 28 is raised out of engagement with the feed screw 32, by the apparatus shown in Figs. 2 and 3, the spring 35 will push the block 28 back against the stop collar 34. If shorter bottles than that shown in Fig. 1 are being operated upon, the stop collar 34 will be set farther forwardly on the rod 29, so that the finger 27 will not have to travel so far to bring the bottle to the testing station at 33.

The means for tripping the block 28 out of engagement with the screw 32 at the end of advancing movement, comprises a rock shaft 37 journaled in the framework of the machine and having rigidly secured thereto arms 38 and 39 that carry a bar 40. The rock shaft 37 also carries a handle 41. When it is desired to interrupt advancing movement of a bottle at the completion of a testing operation, the handle 41 will be depressed by the operator, thus causing the bar 40 to move upwardly and raise the outer end of the block 28 out of engagement with the screw, the spring 35 then acting to push the block 28 and the finger 27 back to starting position, whereupon the handle 41 will be released, allowing the bar 40 to fall and the block 28 to drop into engagement with the screw 32.

In the form of apparatus shown in Figs. 1 to 3, the impacts are produced by steel balls 42 that are caused to fall one by one through a tube 43 upon the bottles as the bottles are advanced and rotated in the manner heretofore described. The balls will be fed at such rate and the bottle rotated and advanced at such rates that the bottle will be subjected to a desired number of impacts. These impacts will be along a helical line on the surface of the bottle. The thread pitch of the screw 32 will, of course, determine the axial distance of the points of impact on the bottle, while the rate of rotation of the rolls 12 and the rate at which the balls are fed to the tube 43 will determine the extent of circumferential spacing of the impacts on the surface of the bottle.

A continued supply or flow of balls 42 is obtained by means of a lifting or feeding device that comprises an impeller 44 operating in a casing 45 that communicates with the lower end of a tubular column 46 that in turn communicates at its upper end with a tube 47 that has telescopic fit with the column 46 and communicates through 48 with the tube 43; the tubes 46, 47 and 48 being kept full of balls so that as balls are pushed one by one into the lower end of tube 46, there will be one by one discharge of the balls to the tube 43 from whence they will fall against the bottles. Vertical adjustment of the tube 47, and hence of 48 and 43 carried thereby, is effected by loosening a clamp collar 49 which normally holds the upper end of tube 46 clamped against the tube 47. This vertical adjustment will permit of dropping the balls at varying heights from the upper end of tube 43.

As the impeller revolves, the balls are moved from the inlet opening at a runway 52 to the discharge opening 53 of the casing, and thence into the lower end of the tube 46. A stripper or deflector element 54 is secured to the casing 45 and projects into an annular slot in the impeller 44, so that as the balls approach the discharge opening 53, the member 54 will deflect them out of the semi-circular pockets that are formed in the impeller. Continued rotation of the impeller and advancing movement of the succeeding balls will cause the balls to be pushed upwardly into the tube 46.

After the balls have fallen from the tube 43 against a bottle, they will drop upon a belt 55 that is inclined toward the front end of the machine, so that the balls will roll into a trough 56 which is inclined in a direction to cause the balls to roll into the runway 52. The belt 55 passes around rollers 57 and 58 that are journaled in the side walls of the casing 11. A plate 59 is secured to the side walls of the casing 11, beneath the upper run of the belt 55, so as to support the belt against the weight of the balls and broken glass. Adjustment of the tension of the belt is effected by adjustment screws in a suitable manner, one of said screws being indicated at 60 and having connection with one of the bearings for the roller 58. The shaft for the roller 57 is provided with a crank 61 whereby the roller 57 will be turned in a clockwise direction as viewed in Fig. 1, to effect discharge of broken glass from the upper end of the belt. This operation need be performed only when broken glass has accumulated on the belt 55 to such an extent as to interfere with rolling movement of the balls to the lower end of the belt and into the trough 56. The bottles can be removed through the opening 25 manually, or they can be pushed therethrough automatically by a succeeding bottle to a suitable conveyer, when desired.

Referring now to Fig. 4, I show apparatus for testing the bottles otherwise than by dropping balls thereon. In this form of apparatus, the rollers 12 and the pusher finger 27 may be operated in the same manner as in Figs. 1 to 3. However, instead of providing for circulatory movement of steel balls to produce the impacts, I employ a hammer 62 for hitting the bottles. This hammer is mounted on an arm 63 which is pivotally supported at 64 upon the framework of the machine. A spring 65 moves the hammer into engagement with the bottle, this spring being supported upon the spring seat 66 that is adjustable by a screw 67 turning in a nut 68 that is secured to the frame of the machine. The force of the impacts can thereby be varied as desired. A cam 69 is driven from the motor 18 through suitable driving connections not shown, and has engagement with the upper side of the arm 63 at its outer end. It will be seen that as the high portion 70 of the cam passes off of the arm 63, the spring will snap the arm in a counterclockwise direction to cause impingement of the hammer 62 against the bottle. The cam 69 will, of course, be rotated at a rate to secure the desired number of impacts during a given period of time.

In Figs. 5 to 8 I show apparatus wherein the bottles may be advanced and rotated in the same manner as in Figs. 1 to 3, and wherein the balls may be circulated through the system in the same general manner as in Figs. 1 and 2. However, in this arrangement, release of the balls that are fed upwardly through the tube 47 is controlled by electromagnets 72 and 73. The balls as they leave the upper end of the tube 47 one by one enter a runway 74 and to the front of the electromagnet 72, where each one is temporarily held against crowding a ball that is about to be released from magnet 73. A spring arm 75 is positioned in front of the magnet 72 and, when the magnet is energized, the spring arm will be held against it as well as the foremost ball 42. The magnet 72 is periodically deenergized, as hereinafter explained, thus permitting the spring arm 75 to flex away from the magnet and disengage the ball from the residual magnetism of 72, so that the ball will roll on a transverse runway 76 to a point beneath the magnet 73 which will at that time be energized to hold the ball against a core 77, as shown in Figs. 5 and 7. Upon deenergization of the magnet 73, as will be hereinafter explained, the ball is released so that it will fall against a bottle, as indicated by the arrows in Fig. 5. The core may suitably be of soft iron, but with its tip formed of steel so as to reduce wear. The advantage of this arrangement is that the balls will not have any rotative movement when they hit the bottle, thus making for more uniformity of impacting force.

The magnets have electrical connection with a suitable supply line 79. The magnet 72 has connection therewith through conductors 80 and 81, a rotary switch 82 and a conductor 83, while the circuit of the magnet 73 is through a conductor 84, a conductor 85, the conductor 81, switch 82 and the conductor 83. The drum of the switch is driven by a sprocket chain 87 from the motor 18 or some other suitable source, and is so timed that it will effect feeding movement of a ball each time that the impeller 44 moves another ball into the vertical tube 46. When the circuit through the brush 88 of the solenoid circuits is broken through rotation of the switch drum, a ball held suspended by the magnet 73 will be released and the armature 90 of the spring arm 75 will also be released, so that as one ball falls from the core 77 of the magnet 73, another ball will be pushed into place beneath the magnet 73 by the spring arm 75, and at the completion of this last-named movement, the switch will again have closed the circuits through the magnets, so that the ball at the magnet 73 will be held in suspended position while the spring arm 75 will be attracted to the magnet 72 to permit another ball to roll by gravity from the runway 74 into position in front of the magnet 72. At this time, the switch will break the circuits through the magnets. This cycle of operations will automatically be repeated during the conducting of testing operations.

I claim as my invention:

1. Apparatus for testing glass bottles and the like, comprising means for moving a bottle longitudinally of its axial line, means for simultaneously rotating the bottle about its axis, and means for imparting impacts thereto during the said movements, at a predetermined point along the path of travel.

2. Apparatus for testing glass bottles and the like, comprising means for rotating a bottle and simultaneously imparting traveling movement thereto in a direction generally parallel to its axis of rotation, and means for imparting impacts thereto at a given point along the path of travel, in timed relation to the rate of said traveling and rotary movements.

3. Apparatus for testing glass bottles and the like, which comprises means for imparting simultaneous relative rotary and longitudinal movements to a bottle and an impacting device, and means for simultaneously imparting impacts to the article, whereby the bottle has a succession of blows imparted thereto along a generally helical path on its surface.

4. Apparatus for testing glass bottles and the like, which comprises means for imparting simultaneous longitudinal and rotary movements to a bottle, past a given point, and means for simultaneously dropping weight elements on the bottle at said point.

5. Apparatus for testing glass bottles and the like, which comprises means for imparting simultaneous longitudinal and rotary movements to a bottle, past a given point, and means for simultaneously dropping weight elements on the bottle at said point, the last-named means comprising a device for collecting the said elements after they have hit the bottle, and delivering them to an elevated position from where they are dropped to said point.

6. Apparatus for testing glass bottles and the like, which comprises means for imparting simultaneous longitudinal and rotary movements to a bottle, past a given point, and means for simultaneously dropping weight elements on the bottle at said point, the last-named means comprising a device for collecting the said elements after they have hit the bottle, and delivering them to a vertically adjustable discharge conduit from which they are dropped to said point.

7. Apparatus for testing glass bottles and the like, which comprises means for imparting simultaneous longitudinal and rotary movements to a bottle, past a given point, an impacting hammer, and means for imparting reciprocating movements to the hammer in timed relation to movements of the bottle, to impart impacts to the bottle at said point.

8. Apparatus for testing glass bottles and the like, comprising means for imparting simultaneous longitudinal and rotary movements to a bottle, past a given point, means for feeding spherical weights to a station above said point, and means for temporarily holding each of the weights, successively against rolling movement and then releasing it to fall upon the bottle.

9. Apparatus for testing glass bottles and the like, comprising means for imparting simultaneous longitudinal and rotary movements to a bottle, past a given point, means for feeding spherical weights to a station above said point, and means for temporarily holding each of the weights, successively, against rolling movement and then releasing it to fall upon the bottle, the said means comprising an electromagnet whose circuit is periodically interrupted.

10. Apparatus for testing glass bottles and the like, comprising means for imparting longitudinal and rotary movements to a bottle, past a given point, means for feeding spherical weights to a station above said point, and means for temporarily holding each of the weights, successively, against rolling movement and then releasing it to fall upon the bottle, the said means comprising a pair of electromagnets whose circuits are periodically broken, the one magnet serving to effect movement of the spheres one-by-one to a point beneath the other magnet which temporarily holds the spheres in suspended position.

11. Testing apparatus comprising a pair of laterally-spaced supporting rolls, that are disposed in a generally horizontal plane, a pusher device for engaging articles supported on the rolls, means for turning the rolls to rotate the articles, means for driving the pusher device to move the articles past a testing station, and means for imparting impacts to the articles at said station.

12. Testing apparatus comprising a pair of laterally-spaced supporting rolls that are disposed in a generally horizontal plane, a pusher device for engaging articles supported on the rolls, means for turning the rolls to rotate the articles, means for driving the pusher device to move the articles past a testing station, and means for imparting impacts to the articles at said station, the said turning, pushing and impacting means all operating at predetermined relative speeds.

FRANK W. PRESTON.